Nov. 27, 1945.   H. J. MILLER   2,389,864
ATOMIZING SPRAYER FOR MEDICINAL AND CHEMICAL PREPARATIONS
Filed Sept. 28, 1943   3 Sheets—Sheet 1

Inventor
Henry J. Miller
By Clarence A. O'Brien
and Harvey B. Jacobson
Attorneys

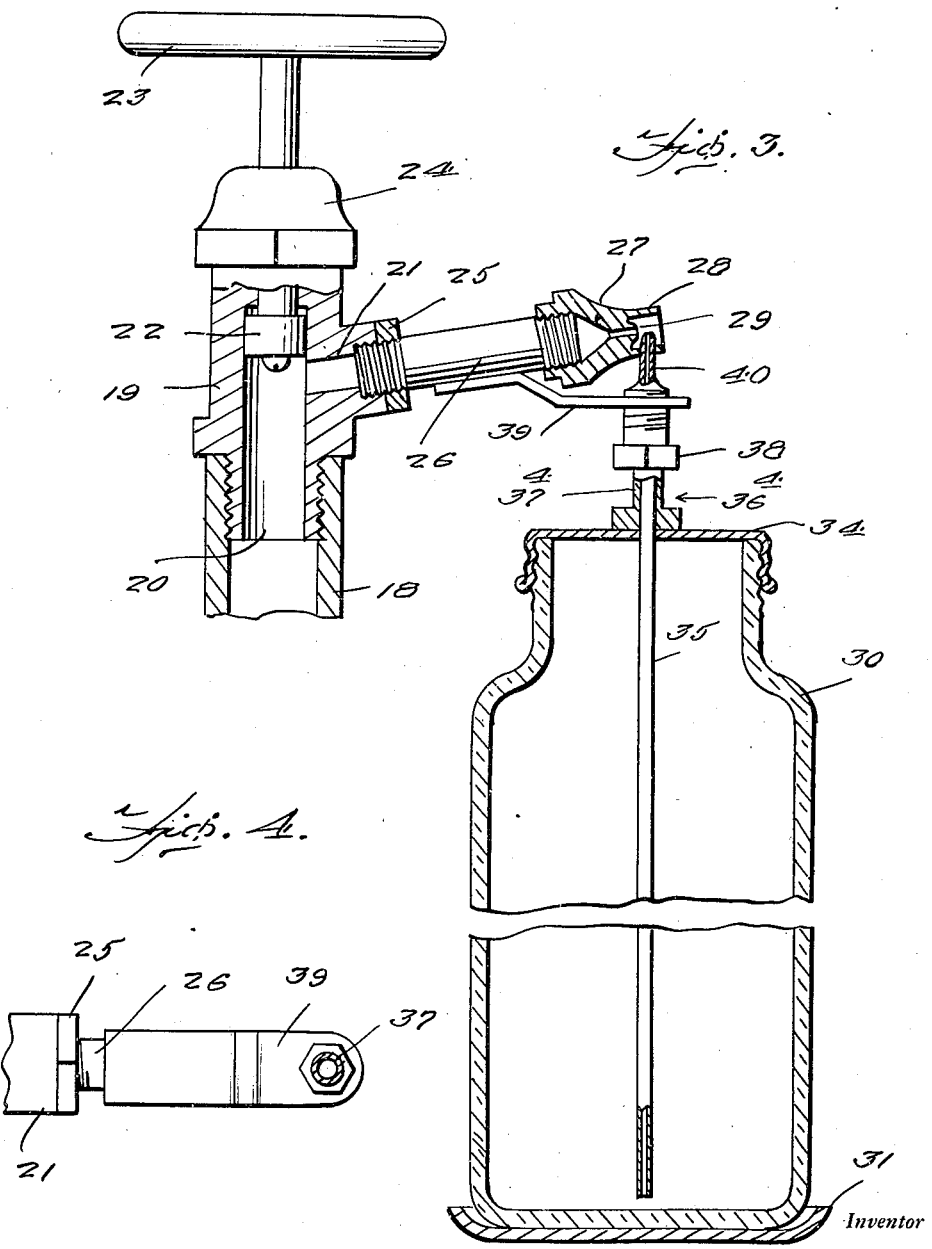

Patented Nov. 27, 1945

2,389,864

UNITED STATES PATENT OFFICE 2,389,864

ATOMIZING SPRAYER FOR MEDICINAL AND CHEMICAL PREPARATIONS

Henry J. Miller, Sioux Falls, S. Dak., assignor of one-third to Violet Moore, Sioux Falls, S. Dak.

Application September 28, 1943, Serial No. 504,179

1 Claim. (Cl. 299—87)

This invention relates to a novel and improved atomizing and spraying device which while adequately useful for treatment of human ailments arising from respiratory and bronchial irritations, is primarily adapted for dispensing vaporous medicinal inhalants, germicides and insecticides for poultry and live stock.

More specifically, in embodying the inventive principles in a preferred construction, I have evolved and produced an ingenious portable structure to dispense, in proper consistency for use, a mixture of steam and medicines or chemicals as the case may be, said structure functioning as both a saturator and penetrator.

A further aim is in reference to a structure in this classification of predetermined construction which lends itself admirably well to dispensing, under pressure of 60 pounds up to 100 pounds, a medicated vapor or gaseous fixture highly useful for fumigating and disinfecting hatchery brooder rooms, incubators, poultry houses, hospitals, theatres and the like, that is, wherever such air conditioning and fumigation is deemed advisable or necessary.

In carrying out the preferred adaptations and final structural embodiment of the invention I have had in mind the production of a highly useful sprayer characterized by carefully chosen parts coordinated into a relatively simple assemblage which is practicable, feasible for the many uses and functions it serves, and otherwise capable of achieving the diversified purposes for which it is appropriately usable.

Other features and advantages of the invention will become more readily apparent from the following description and the accompanying illustrative drawings.

In the drawings, wherein like numerals are employed to designate like parts throughout the views:

Figure 3 is an enlarged fragmentary detail view partly in section and partly in elevation detailing the solution bottle and nozzle construction and arrangement.

Figure 4 is a detail view of the adapter bracket carried by the steam spray nozzle.

Figure 1:
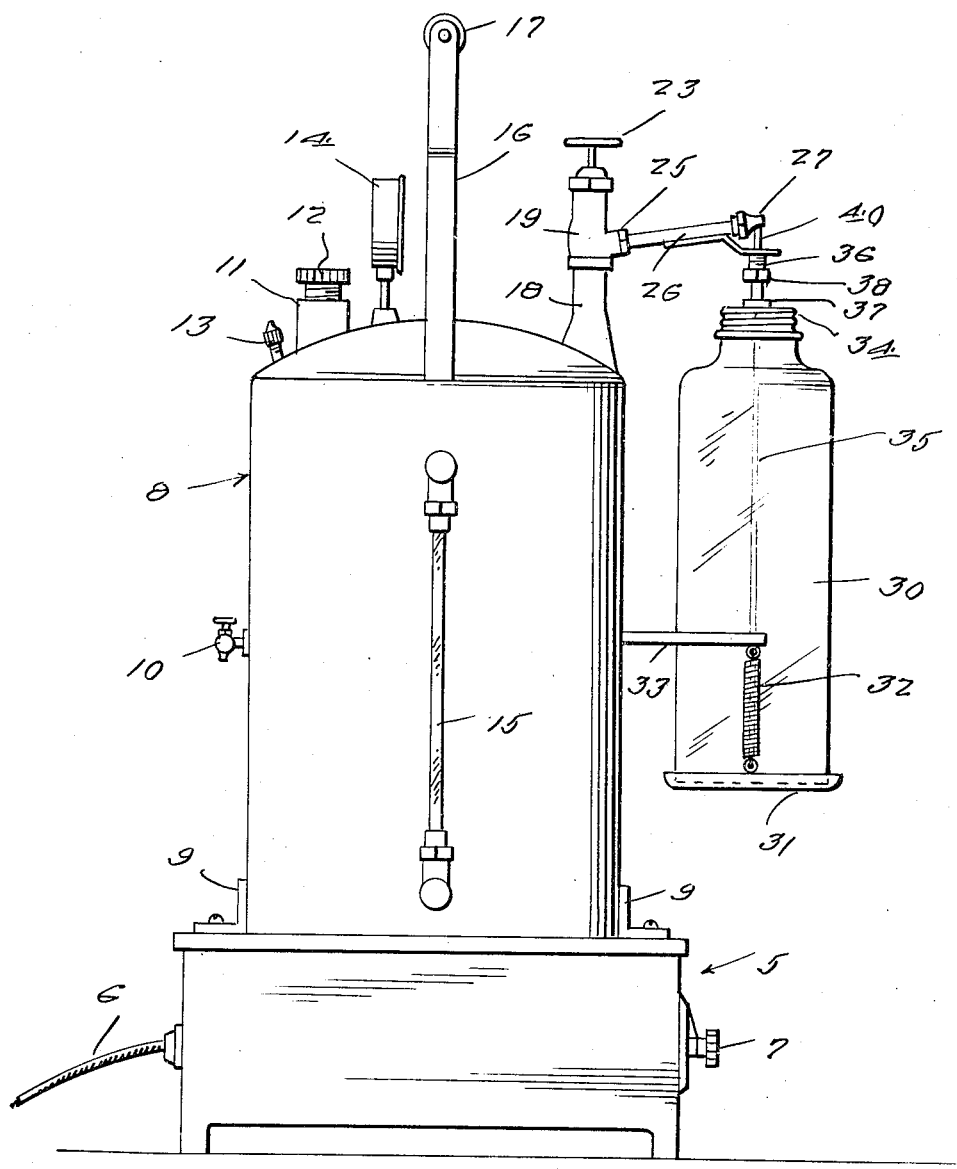
Figure 1 is a view which may be conveniently described as a side elevation of a pressure type dispenser constructed in accordance with the specific principles of the present inventive conception.
Figure 2:
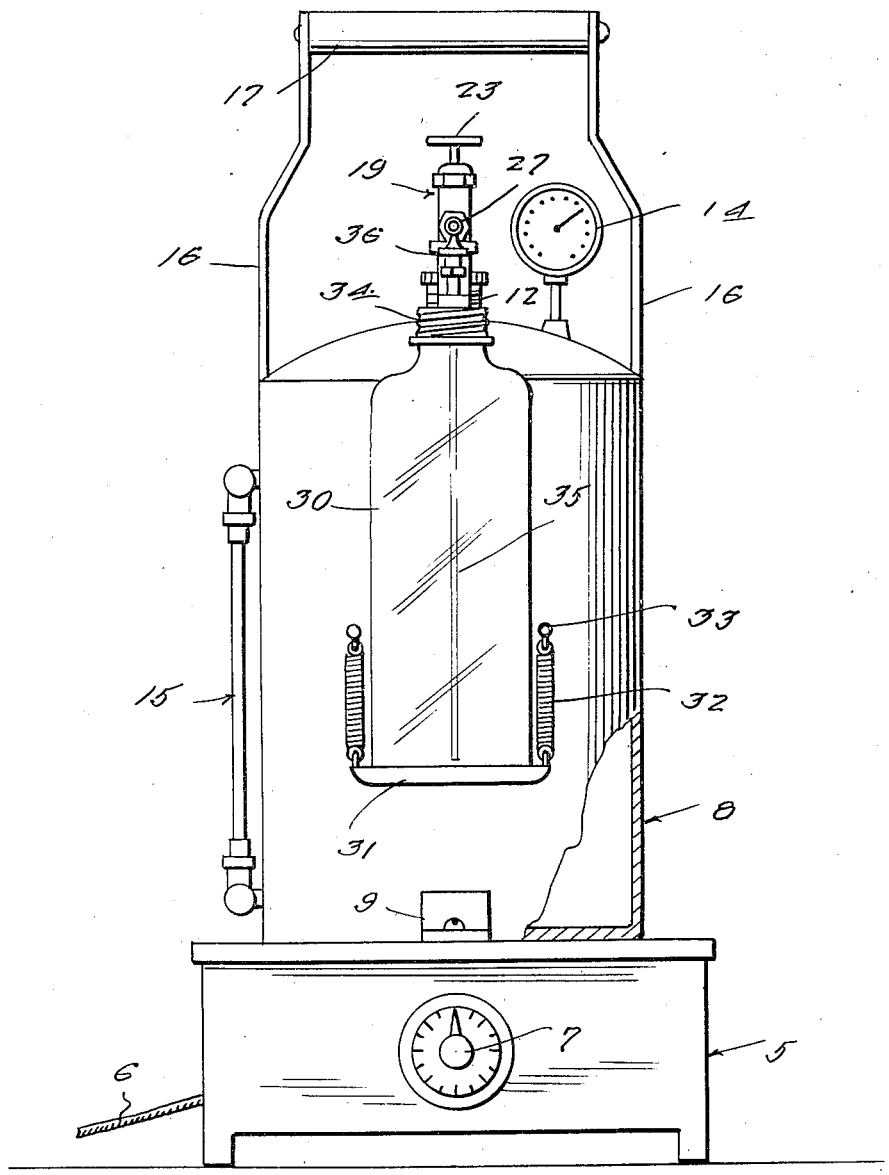
Figure 2 is a front view, that is, a view at right angles to Figure 1 observing it in a direction from right to left with a portion broken away and shown in section.

Referring now to the drawings, the heating means is referred to generally by the reference numeral 5. This is of appropriate construction and is of no moment in so far as the patentable novelty of the invention is concerned. In the drawings I have disclosed an electric heater embodying a current supply conductor wire 6 and a control switch 7. In practice the heater may be a fuel burner or any other appropriate type so long as it provides a suitable base and source of heat supply for the boiler 8. The latter part is constructed of appropriate material and is of a suitable capacity, this depending on the conditions and steam pressure required. The boiler is held on the base by appropriate brackets 9 and is provided on one side with a drain cock 10. At its top it is provided with a filler neck 11 with a screw closing cap 12, a suitably constructed and arranged blow-off valve 13 of desired sensitivity, and a steam pressure gauge 14. On one side is the glass water gauge 15. Suitable straps or arms 16 attached to the top serve as mountings for an appropriate handle 17, this arrangement to facilitate carrying and otherwise handling the structure in toto. The steam discharge and take-off tube is indicated at 18. This is provided with a substantially L-shaped fitting 19 whose intake neck 20 is threaded into the delivery or discharge tube 18 as brought out to advantage in Figure 3. As also seen here, the steam take-off branch 21 is regulated by a cut-off valve 22 carried on the stem of the valve handle or wheel 23, the stem being threaded for operation in an appropriate gland or head 24. Threaded into the branching neck 21 and held in place by a lock nut 25 is a steam conducting nipple 26. This has threaded on its outer end a nozzle 27, the nozzle being chambered at its terminal end as at 28 and constructed to form a shielded restricting jet 29 communicating with the inner end of the terminal chamber 28.

I next call attention to the medicine or chemical bottle 30. Inasmuch as this adapted to hold insecticides, germicides, medicaments and chemicals it is thought that these liquids can be referred to broadly as "solutions." Therefore, the part 30 is a solution bottle and fits at its lower end in a pan 31, said pan being suspended by coiled springs 32 attached to the outer ends of hanger arms 33 carried by the intermediate portion of the boiler. The neck of the jar or bottle is provided with a screw cover or cap 34 and the lift pipe 35, which depends into the bottle, and extends upwardly through and beyond said cap where it accommodates the solution adapter unit 36. This adapter comprises a flanged neck 37 which fits down over the upper protruding end of the lift pipe 35. It includes an integral nut 38 which is threaded into a screw-threaded hole in the outer end of the accommodation bracket 39. The adapter then terminates at its upper end in a nozzle 40 which passes through an aperture in the jet chamber 28, where its discharge end is located in line with the restricted passage 29 of the nozzle 27.

It is evident that the boiler is charged with water by way of the filler neck 11 and the plug 12 is closed. The solution bottle 30 is placed in the pan or tray 31 and is suspended and pressed up into place by the springs 32. That is to say, the springs force the upper protruding end of the lift pipe 35 into the flanged neck 37 of the adapter unit 36. This is carried by the arm 39 and the parts are thus set for operation. The steam generated in the boiler passes up through the take off or discharge tube 18 where it enters the nozzle 27 by way of the valved fitting 19 and nipple 26. The steam under pressure creates the necessary suction to elevate the solution through the pipe 35 where it is mixed with the outgoing steam thus producing a vapor-like mixture for various useful purposes depending on the nature of the contents of said bottle 30.

An instrument or device constructed in accordance with the principles of this invention forms a spray which is capable of positive penetration, and develops full saturation due to the high power of delivery. Provision is also made for greater economy and exterminating power. The device is such as to be suitably serviceable in unskilled hands, is substantially fool-proof, requires little care, makes for long life and gives perfect service all around. As previously stated, it is not only adaptable for use in creameries, hatcheries and the like, but is susceptible of acceptable use in hospitals, sick rooms, theatres, restaurants and public gathering places and the like. It is not the purpose of the instant discussion, however, to cover the various commercial aspects of the invention.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having described the invention, what is claimed as new is:

In a sprayer of the class described, a horizontal tube having one end adapted to be connected with a source of steam under pressure, a nozzle carried by the other end of said tube and terminating in a longitudinal jet surrounded by an outwardly projecting tubular shield formed with a vertical aperture in its under side, an arm carried by said tube and extending longitudinally thereof under said nozzle and having its outer end formed with a screw-threaded opening, an adapter including an externally screw-threaded body disposed vertically under said nozzle and threaded upwardly through said screw-threaded opening of said arm, said adapter having a nozzle at its upper end passing upwardly through the opening in the under side of the shield at the terminal end of the first-named nozzle and terminating in adjusted spaced relation to the front end of the jet, a cap for a container formed with an opening, a nipple carried by said cap about the opening therein and having an unthreaded neck thrust upwardly into the lower end of said adapter, and a lift tube carried by the nipple of said cap and extending downwardly through the opening in the cap.

HENRY J. MILLER.